(12) United States Patent
Francis et al.

(10) Patent No.: US 7,082,956 B2
(45) Date of Patent: Aug. 1, 2006

(54) REGULATOR WITH FLOW DISTRIBUTOR

(75) Inventors: Kevin Francis, Hampton, VA (US); Jason T. Kilgore, Newport News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 240 days.

(21) Appl. No.: 10/810,678

(22) Filed: Mar. 29, 2004

(65) Prior Publication Data
US 2005/0211304 A1   Sep. 29, 2005

(51) Int. Cl.
G05D 16/02 (2006.01)
G05D 16/08 (2006.01)

(52) U.S. Cl. .................. 137/14; 123/457; 137/508; 251/120; 251/127

(58) Field of Classification Search .......... 137/508, 137/14; 123/459, 457, 511; 251/120, 127
See application file for complete search history.

(56) References Cited
U.S. PATENT DOCUMENTS 5,398,721 A * 3/1995 Pryor .................. 137/613
6,269,828 B1 * 8/2001 Kilgore et al. ........... 137/14
6,286,486 B1 * 9/2001 Robinson et al. ........ 123/457
6,761,185 B1 * 7/2004 De Leeuw ............... 137/503
6,782,871 B1 * 8/2004 McIntyre et al. ........ 123/457

* cited by examiner

Primary Examiner—Stephen M. Hepperle

(57) ABSTRACT

A flow-through pressure regulator having a housing, and a divider. The housing includes an inlet and an outlet disposed along a longitudinal axis. The divider separates the housing into a first chamber and a second chamber, and includes a seat, a diaphragm, a retainer and a flow distributor member. The seat includes a sealing surface and a second surface, and defines a first flow path from the sealing surface to the second surface. The diaphragm extends between the housing and the seat. The retainer secures the diaphragm to the seat, and may include a base portion proximate the seat, an intermediate portion extending along the longitudinal axis from the base portion toward the outlet, an end portion extending from the intermediate portion, and at least one aperture that permits fluid communication between the first flow path and the second chamber. The flow distributor member is disposed between the first flow path and the end portion, and defines a second flow path with the second seat surface such that the second flow path includes a second flow axis disposed radially outward from the longitudinal axis.

16 Claims, 2 Drawing Sheets

REGULATOR WITH FLOW DISTRIBUTOR

FIELD OF THE INVENTION

This invention relates to a pressure regulator for automotive fuel systems, and more particularly to a flow through pressure regulator having flow noise reduction.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be controlled to ensure the proper operation of the fuel injectors. Pressure is controlled using pressure regulators that control the pressure of the fuel in the system at all engine r.p.m. levels.

Fuel flow rate through known pressure regulators tends to be low at high engine speed, as large quantities of fuel are consumed in the combustion process. At low engine speeds, less fuel is consumed in combustion and flow rates through the pressure regulators are high. These high fuel flow rates can produce unacceptably high noise levels.

A known pressure regulator includes a divider having a seat, a diaphragm and a retainer. The divider separates a housing into a first chamber and a second chamber. The seat defines a passage extending along a longitudinal axis of the housing between the first and second chambers. The seat includes a first portion proximate the first chamber having a first cross-sectional area and a second portion proximate the second chamber and having a second cross-sectional area. The first cross-sectional area is greater than the second cross-sectional area. The diaphragm extends between the housing and the seat. The retainer includes a plurality of apertures having a flow axis oriented along the longitudinal axis. The apertures diffuse flow and reduce operational noise of the regulator.

It is believed that there is a need for a pressure regulator that reduces flow-related noise at high fuel flow rates more than the known pressure regulator, while still being inexpensive to manufacture.

SUMMARY OF THE INVENTION

In an embodiment, the invention provides a flow-through pressure regulator having a housing with an inlet and an outlet disposed along a longitudinal axis, a divider that separates the housing into a first chamber and a second chamber, and a closure member. The divider includes a seat, a diaphragm, a retainer and a flow distributor member. The seat includes a sealing surface in the first chamber and a second surface in the second chamber, and defines a first flow path from the sealing surface to the second surface, such that the first flow path includes a first flow axis along the longitudinal axis. The diaphragm extends between the housing and the seat. The retainer secures the diaphragm to the seat, and includes a base portion proximate the seat, an intermediate portion extending along the longitudinal axis from the base portion toward the outlet, and an end portion extending from the intermediate portion. The end portion includes at least one aperture that permits fluid communication between the first flow path and the second chamber. The flow distributor member is disposed between the first flow path and the end portion, and defines a second flow path with the second seat surface such that the second flow path includes a second flow axis disposed radially outward from the longitudinal axis. The closure member is arranged between first and second configurations relative to the sealing surface, the first configuration substantially preventing fluid communication through the first flow path, and the second configuration permitting fluid communication through the first flow path.

The flow distributor member may include a lower surface, an upper surface, and a side surface between the lower surface and the upper surface such that the lower surface defines the second flow path with the second seat surface. The flow distributor member side surface and the retainer intermediate portion may define a third flow path such that the third flow path includes a third flow axis along the longitudinal axis. The flow distributor member side surface may include a stepped portion proximate the flow distributor member upper surface such that the stepped portion and retainer end portion define a fourth flow path having a fourth flow axis disposed radially inward toward the longitudinal axis. The flow distributor member may include a plurality of projections, each of the projections having a proximate end and a distal end. The proximate end may engage the flow distributor member side surface, and the distal end may engage the intermediate portion of the retainer. The proximate end may extend between the flow distributor member lower surface and the flow distributor member upper surface, and may be integrally formed with the flow distributor member side surface. An upper portion of the proximate end may include a surface that forms a continuous curve with the stepped portion. The flow distributor member may be formed of plastic or metal. The second seat surface, the retainer intermediate portion, and the retainer end portion may define a collection chamber that is in fluid communication with the first flow path and the aperture.

The flow-through pressure regulator may include a resilient element extending along the longitudinal axis and biasing the divider toward the closure member. The housing may include first and second housing parts, the first housing part may include the inlet and define the first chamber, and the second housing part may include the outlet and define the second chamber. The diaphragm may include a first perimeter sandwiched between the first and second housing parts. The base portion may include an annular portion extending outwardly from the intermediate portion relative to the longitudinal axis. The diaphragm may include a second perimeter being sandwiched between the seat and the annular portion. The resilient element may include a first end engaging the second housing part and a second end engaging the annular portion.

In another embodiment, the invention provides a method of flowing fluid through a pressure regulator. The pressure regulator includes a divider that separates a housing into a first chamber and a second chamber. The housing includes an inlet and an outlet disposed along a longitudinal axis. The divider includes a seat, a diaphragm, a retainer and a flow distributor member. The seat defines a first flow path having a first flow axis along the longitudinal axis. The flow distributor member defines a second flow path with the seat such that the second flow path includes a second flow axis disposed radially outward from the longitudinal axis. The retainer includes at least one aperture, and the diaphragm extends between the housing and the seat. The method includes flowing the fluid through the first flow path, flowing the fluid through the second flow path, and flowing the fluid through the aperture.

In yet another embodiment, the invention provides a method of flowing fluid through a pressure regulator. The pressure regulator includes a divider that separates a housing into a first chamber and a second chamber. The housing includes an inlet and an outlet disposed along a longitudinal axis. The divider includes a seat, a diaphragm and a retainer. The retainer includes at least one aperture, and the diaphragm extends between the housing and the seat. The method includes flowing the fluid through a flow path formed in the seat, redirecting the fluid radially outward from the longitudinal axis, redirecting the fluid in the direction of the longitudinal axis, and flowing the fluid through the at least one aperture.

The redirecting the fluid radially outward from the longitudinal axis may include disposing a flow distributor member between the seat and the aperture. The disposing the flow distributor member between the seat and the aperture may include engaging an intermediate portion of the retainer with protrusions that extend radially outward from the flow distributor member. The redirecting the fluid in the direction of the longitudinal axis may include forming another flow path with a side surface of the flow distributor member and an intermediate portion of the retainer.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain features of the invention.

DETAILED DESCRIPTION OF THE PREFERRED EMBODIMENTS

Figure 1:
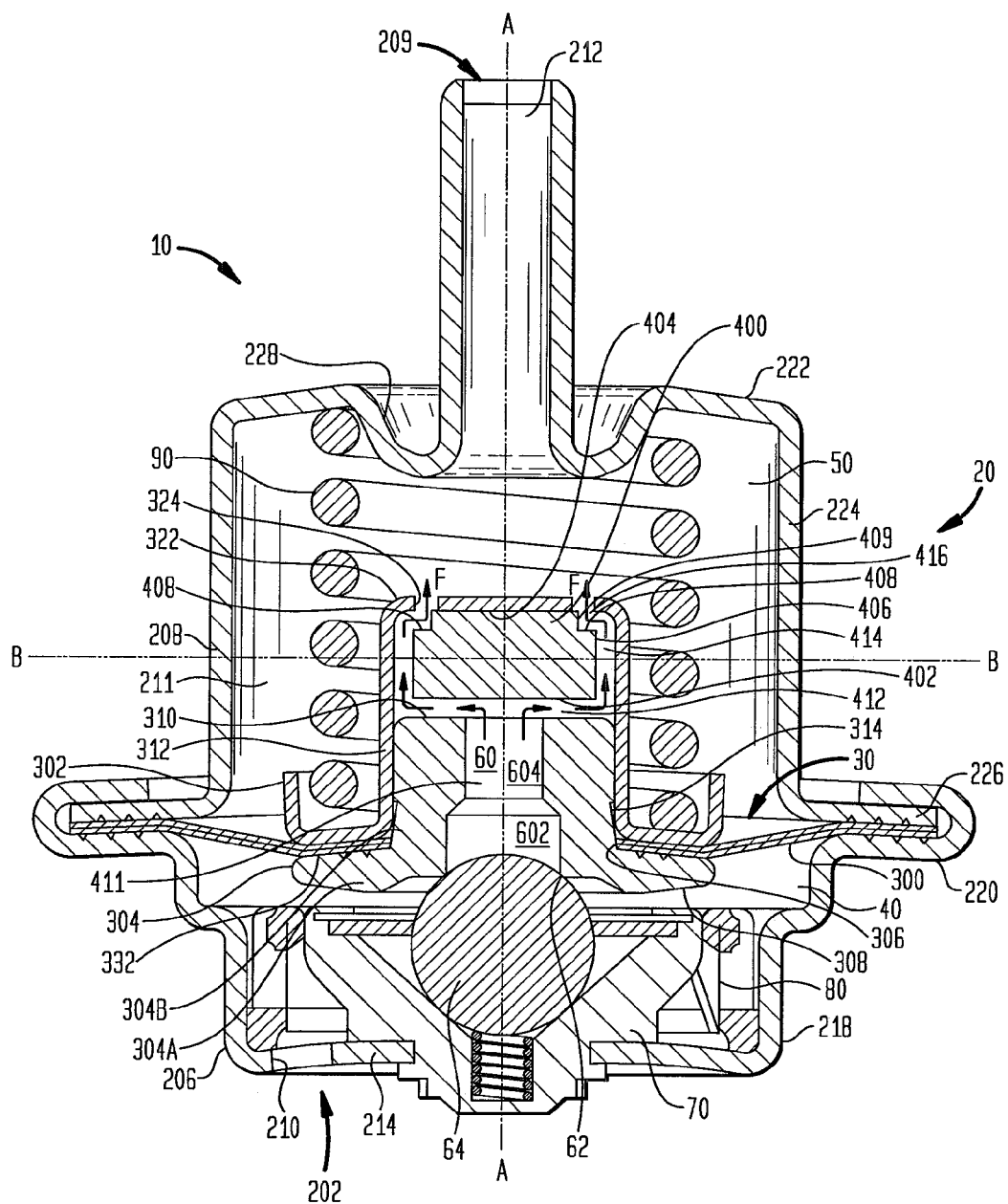
FIG. 1 is a flow-through pressure regulator having a flow distributor member, according to an embodiment of the invention.

FIG. 1 illustrates a flow-through pressure regulator 10 according to a preferred embodiment. The flow-through pressure regulator 10 includes a housing 20. The housing 20 is separated by a divider 30 into a first chamber 40 and a second chamber 50. The divider 30 has a passage 60 that communicates the first chamber 40 with the second chamber 50. A closure member 70 permits or inhibits flow through the passage 60. A filter 80 may be disposed in the flow path of the housing 20. The housing 20 has an inlet 202 and an outlet 204 offset along a longitudinal axis A—A. The housing 20 can include a first housing part 206 and a second housing part 208 that are crimped together to form a unitary housing 20 with a hollow interior 211. Although the unitary housing is formed by two joined members, it is to be understood that the unitary housing could be formed with multiple members integrated together or, alternatively, a monolithic member. The inlet 202 of the housing 20 is located in the first housing part 206, and the outlet 204 of the housing 20 is located in the second housing part 208. The inlet 202 can be a plurality of apertures 210 located in the first housing part 206. The outlet 204 can be a port 212 disposed in the second housing part 208.

The first housing part 206 can include a first base 214, a first lateral wall 218 extending in a first direction along the longitudinal axis A—A from the first base 214, and a first flange 220 extending from the first lateral wall 218 in a direction substantially transverse to the longitudinal axis A—A. The second housing part 208 can include a second base 222, a second lateral wall 224 extending in a second direction along the longitudinal axis A—A from the second base 222, and a second flange 226 extending from the second lateral wall 224 in a direction substantially transverse to the longitudinal axis A—A. The divider 30, which can include a diaphragm 300, is secured between the first flange 220 and the second flange 226 to separate the first chamber 40 and the second chamber 50. The first flange 220 can be rolled over the circumferential edge of the second flange 226 and can be crimped to the second flange 226 to form the unitary housing 20.

A first biasing element 90, which is preferably a spring, is located in the second chamber 50. The first biasing element 90 engages a locator 228 on the base 222 of the second housing part 208 and biases the divider 30 toward the base 214 of the first housing part 206. The first biasing element 90 biases the divider 30 of the regulator 10 at a predetermined force, which relates to the pressure desired for the regulator 10. The base 222 of the second housing part 208 has a dimpled center portion that provides the outlet port 212 in addition to the locator 228. The first end of the spring 90 is secured on the locator 228, while the second end of the spring 90 can be supported by a retainer 302, which is secured to a valve seat 304 mounted in a central aperture 306 in the diaphragm 300.

In a preferred embodiment, the valve seat 304 is suspended by the diaphragm 300 in the housing 20, and provides the passage 60 that includes a first section 602 and a second section 604. The valve seat 304 has a first seat portion 304A and a second seat portion 304B disposed along the longitudinal axis A—A. The first seat portion 304A is disposed in the first chamber 40 and the second seat portion 304B is disposed in the second chamber 50. The first section 602 of the passage 60 extends along the longitudinal axis A—A in both the first portion 304A and the second portion 304B of the valve seat 304. The second section 604, which also extends along the longitudinal axis A—A, is in the second portion 304B of the valve seat 304.

The valve seat 304 preferably has a first surface 308 disposed in the first chamber 40, a second surface 310 disposed in the second chamber 50, and a side surface 312 extending between the first surface 308 and the second surface 310. The first section 602 of the passage 60 communicates with the first surface 308. The second section 604 of the passage 60 communicates with the first section 602 and the second surface 310. The first section 602 has a first cross-sectional area and the second section 604 has a second cross-sectional area that is smaller than the first cross-sectional area. The first section 602 and the second second 604 of seat passage 60 define a first flow path 411 having a first flow axis disposed along longitudinal axis A—A. The cross-sectional areas of the first section 602 and the second section 604 are greater than the cross-sectional areas of each of a plurality of apertures 324 described below in more detail. The side surface 312 of the valve seat 304 may include an undercut edge 314 that may enhance the press-fitted connection between the retainer 302 and the valve seat 304. It should be noted that the valve seat 304 of a preferred embodiment can be a monolithic valve seat or, alternatively, separate components that can be assembled.

At an end of the passage 60 opposite the second seat surface 310 is a seating surface 62 for seating the closure member 70, which can be a valve actuator ball 64. In the manufacturing of the valve seat 304, the seating surface 62 is finished to assure a smooth sealing surface for the ball 64.

In a preferred embodiment, the retainer 302 includes an intermediate portion 320 in the form of a cylinder that extends along the longitudinal axis A—A. It is to be understood, however that, intermediate portion 320 could be in the form of other geometric shapes known in the art. According to a preferred embodiment, an inner surface of the intermediate portion 320 is press-fitted with respect to the side surface 312 of the seat 304, and may cooperatively engage the undercut edge 314.

The retainer 302 also includes an end portion 322 that extends radially inward from the intermediate portion 320 in a direction substantially transverse to the longitudinal axis A—A. In a preferred embodiment, the end portion 322 is integrally formed with the intermediate portion 320. For example, the end portion 322 and the intermediate portion 320 may be formed of a flat sheet of metal that is stamped into form. Of course, it is to be understood that the end portion 322 and the intermediate portion 320 may be formed separately and joined. The intermediate portion 320 and the end portion 322 form a chamber 330 in fluid communication with the passage 60, and the plurality of apertures 324 formed in the end portion 322. The plurality of apertures 324 may be stamped in the end portion 322 while end portion 322, and integral intermediate portion 320, are in the flat condition. Apertures 324 may have flow axis' concentric with the longitudinal axis A—A. Apertures 324 permit fluid communication between the passage 60 and the second chamber 50.

In a preferred embodiment, the retainer 302 also includes a base portion 332 that extends from the intermediate portion 320 in a generally radially outward direction relative to the longitudinal axis A—A. The base portion 332 is disposed along the longitudinal axis A—A from the end portion 322 and, in cooperation with the first seat portion 304A, sandwiches the diaphragm 300, thereby coupling the diaphragm 300 to the valve seat 304. The base portion 332 also serves to support and to locate the second end of the spring 90 with respect to the divider 30. In a preferred embodiment, the base portion 332 is formed in substantially the same stamping operation and from the same sheet of metal as the intermediate portion 320 and the end portion 322.

The flow-through pressure regulator 10 includes a flow distributor member 400 disposed between the passage 60 and the apertures 324. Flow distributor member 400 reduces flow-related noise at high fuel flow rates by altering the direction of the flow path of the fuel through one or more angles, for example through a series of right (i.e. 90°) angles. Each of the angles absorbs energy from the fuel flow, thus reducing flow-related noise.

Figure 2:
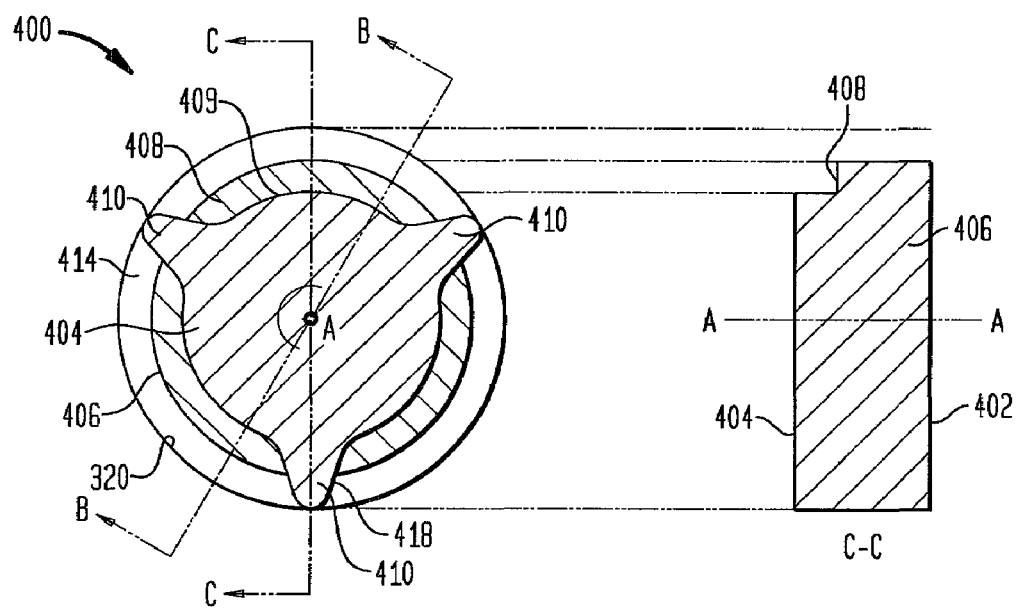
FIG. 2 is a plan view and a sectional view of the flow distributor member of FIG. 1.

As shown in FIGS. 1 and 2, flow distributor member 400 is generally in the form of a cylinder and includes a lower surface 402, an upper surface 404, and a side surface 406 extending between lower surface 402 and upper surface 404. Side surface 406 includes a step 408 and a riser 409 proximate the upper surface 404. Flow distributor member 400 includes projections 410 extending from side surface 406 in a direction that is radially outward from longitudinal axis A—A. Projections 410 are formed on the side surface 406 from the lower surface 402 to the upper surface 404. At a portion proximate upper surface 404, each projection 410 includes a surface 418 that forms a continuous curve with riser 409. FIG. 2 illustrates a cross-section of the flow distributor member 400 at an axis C—C. The cross-section at axis C—C includes step 408 at one portion only due to axis C—C being disposed at projection 410. FIG. 1 illustrates a cross-section of the flow distributor member 400 at an axis B—B. The cross-section at axis B—B includes step 408 at two portions due to axis B—B being disposed away from projections 410.

Flow distributor member 400 is oriented such that lower surface 402 faces second surface 310 of seat 304, upper surface 404 faces end portion 322 of retainer 302, and side surface 406 faces intermediate portion 320 of retainer 302. Projections 410 abut intermediate portion 320 of the retainer 302 to position the flow distributor member 400 within the chamber 330. Lower surface 402 and second surface 310 of seat 304 form a second flow path 412 having a second flow axis disposed radially outward from longitudinal axis A—A. Side surface 406 and intermediate portion 320 of retainer 302 form a third flow path 414 having a third flow axis disposed along the longitudinal axis A—A. Step 408 and end portion 322 of retainer 302 form a fourth flow path 416 having a fourth flow axis disposed radially inward toward the longitudinal axis A—A. First flow path 411, second flow path 412, third flow path 414, and fourth flow path 416 reduce flow-related noise at high fuel flow rates by altering the direction of the flow path of the fuel through a series of right angles. Each of the flow paths absorbs energy of the fuel flow, thus reducing flow-related noise.

As shown and described above, flow distributor member 400 is generally in the form of a cylinder, and is formed separate from the retainer 302. However it is to be understood that flow distributor member 400 may be formed in any suitable manner, so long as flow distributor member 400 forms at least one flow path having a flow axis that is angled with respect to longitudinal axis A—A. For example, flow distributor member may be formed integral with retainer 302. Flow distributor member 400 may be formed of any material suitable for exposure to fuel, such as metal or plastic.

In an exemplary test, the flow-related noise in a flow-through pressure regulator having a flow distributor member was evaluated. At a flow rate of 94 kg fuel/hr, a noise level of 56.4 Sones was measured from a pressure regulator that had all of the components of the preferred embodiment except the flow distributor member. At the same flow rate, a noise level of 22.4 Sones was measured from the preferred embodiment of the pressure regulator with the preferred flow distributor member.

One method of assembling the fuel regulator 10 is by coupling, such as by staking or press-fitting, the closure member 70 to the first housing part 206. The divider 30 is assembled by locating the valve seat 304 in the central aperture 306 of the diaphragm 300, and then press-fitting the retainer 302 with respect to the seat 304 such that the side surface 312 contiguously engages the intermediate portion 320. The assembled divider 30 is located with respect to the upper flange surface 220 of the first housing part 206. The bias spring 90 is positioned in the retainer 302 and the second housing part 208 is then placed over the spring 90. The flange 220 of the first housing part 206 is crimped down to secure the second housing part 208. The first and second housing parts 206,208 and the diaphragm 300 form the first and second chambers 40,50, respectively. The pressure at which the fuel is maintained is determined by the spring force of the bias spring 90.

The operation of the pressure regulator and a method of diffusing fluid flow through the pressure regulator will now be described. The bias spring 90 acts through the retainer 302 to bias the divider 30 toward the base 214 of the first housing part 206. When the ball 64 is seated against surface 62, the pressure regulator 10 is in a closed configuration and no fluid can pass through the pressure regulator 10.

Fluid enters the pressure regulator 10 through apertures 210 and exerts pressure on the divider 30. When the pressure of the fluid is greater than the force exerted by the bias spring 90, the diaphragm 300 moves in an axial direction and the ball 64 leaves the seating surface 62 of the valve seat member 304. This is the open configuration of the pressure regulator 10. Fluid can then flow through the regulator 10. From the first chamber 40, the fluid enters the first fuel path 411, and then passes into the collection chamber 330 and through the second flow path 412, third flow path 414, and fourth flow path 416 formed by the flow distributor member 400. From the fourth flow path 416, the fluid passes through the apertures 324 in the direction of the longitudinal axis A—A into the second chamber 50, before leaving the pressure regulator through the outlet 204.

As the incoming fuel pressure is reduced, the force of the bias spring 90 overcomes the fuel pressure and returns the valve seat member 304 to seated engagement with the ball 64, thus closing the passage 60 and returning the pressure regulator to the closed configuration.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A flow-through pressure regulator, comprising:
   a housing having an inlet and an outlet disposed along a longitudinal axis;
   a divider separating the housing into a first chamber and a second chamber, the divider including:
     a seat having a sealing surface in the first chamber and a second surface in the second chamber, the seat defining a first flow path from the sealing surface to the second surface, the first flow path having a first flow axis along the longitudinal axis;
     a diaphragm extending between the housing and the seat;
     a retainer securing the diaphragm to the seat, the retainer including:
       a base portion proximate the seat;
       an intermediate portion extending along the longitudinal axis from the base portion toward the outlet;
       an end portion extending from the intermediate portion, the end portion including at least one aperture, the at least one aperture permitting fluid communication between the first flow path and the second chamber; and
       a surface disposed between the first flow path and the end portion, the surface defining a second flow path with the second seat surface, the second flow path having a second flow axis disposed radially outward from the longitudinal axis; and
   a closure member being arranged between first and second configurations relative to the sealing surface, the first configuration substantially preventing fluid communication through the first flow path, and the second configuration permitting fluid communication through the first flow path.

2. The flow-through pressure regulator of claim 1, further comprising a flow distributor member having a lower surface that provides the surface, an upper surface, and a side surface between the lower surface and the upper surface, the lower surface defining the second flow path with the second seat surface.

3. The flow-through pressure regulator of claim 2, wherein the flow distributor member side surface and the retainer intermediate portion define a third flow path, the third flow path having a third flow axis along the longitudinal axis.

4. The flow-through pressure regulator of claim 3, wherein the flow distributor member side surface includes a stepped portion proximate the flow distributor member upper surface, the stepped portion and retainer end portion defining a fourth flow path, the fourth flow path having a fourth flow axis disposed radially inward toward the longitudinal axis.

5. The flow-through pressure regulator of claim 4, wherein the flow distributor member comprises plastic.

6. The flow-through pressure regulator of claim 4, wherein the flow distributor member comprises metal.

7. The flow-through pressure regulator of claim 1, wherein the second seat surface, the retainer intermediate portion, and the retainer end portion define a collection chamber, the collection chamber being in fluid communication with the first flow path and the at least one aperture.

8. The flow-through pressure regulator of claim 1, comprising:
   a resilient element extending along the longitudinal axis and biasing the divider toward the closure member,
   wherein the housing includes first and second housing parts, the first housing part including the inlet and defining the first chamber, and the second housing part including the outlet and defining the second chamber,
   wherein the diaphragm includes a first perimeter sandwiched between the first and second housing parts,
   wherein the base portion includes an annular portion extending outwardly from the intermediate portion relative to the longitudinal axis,
   wherein the diaphragm includes a second perimeter being sandwiched between the seat and the annular portion, and
   wherein the resilient element includes a first end engaging the second housing part and a second end engaging the annular portion.

9. The flow-through pressure regulator of claim 4, comprising:
   a plurality of projections, each of the projections having a proximate end and a distal end, the proximate end engaging the flow distributor member side surface, the distal end engaging the intermediate portion of the retainer.

10. The flow-through pressure regulator of claim 9, wherein the proximate end extends between the flow distributor member lower surface and the flow distributor member upper surface, and is integrally formed with the flow distributor member side surface.

11. The flow-through pressure regulator of claim 10, wherein an upper portion of the proximate end includes a surface that forms a continuous curve with the stepped portion.

12. A method of flowing fluid through a pressure regulator, the pressure regulator including a divider separating a housing into a first chamber and a second chamber, the housing having an inlet and an outlet disposed along a longitudinal axis, the divider including a seat, a diaphragm, a retainer and a flow distributor member, the seat defining a first flow path having a first flow axis along the longitudinal axis, the flow distributor member defining a second flow path with the seat, the second flow path having a second flow axis disposed radially outward from the longitudinal axis, the retainer having at least one aperture, and the diaphragm extending between the housing and the seat, the method comprising:

flowing the fluid through the first flow path;
then flowing the fluid through the second flow path; and
then flowing the fluid through the at least one aperture.

13. A method of flowing fluid through a pressure regulator, the pressure regulator including a divider separating a housing into a first chamber and a second chamber, the housing having an inlet and an outlet disposed along a longitudinal axis, the divider including a seat, a diaphragm and a retainer, the retainer having at least one aperture, and the diaphragm extending between the housing and the seat, the method comprising:

flowing the fluid through a flow path formed in the seat;
redirecting the fluid radially outward from the longitudinal axis;
redirecting the fluid in the direction of the longitudinal axis; and
flowing the fluid through the at least one aperture.

14. The method of claim 13, wherein the redirecting the fluid radially outward from the longitudinal axis includes disposing a flow distributor member between the seat and the at least one aperture.

15. The method of claim 14, wherein the disposing the flow distributor member between the seat and the at least one aperture includes engaging an intermediate portion of the retainer with protrusions that extend radially outward from the flow distributor member.

16. The method of claim 14, wherein the redirecting the fluid in the direction of the longitudinal axis includes forming another flow path with a side surface of the flow distributor member and an intermediate portion of the retainer.

* * * * *